June 29, 1965 E. J. BUZICKY ETAL Re. 25,814

APPARATUS FOR DISPENSING PARTICULAR MATERIAL

Original Filed Nov. 16, 1959 3 Sheets-Sheet 1

INVENTORS:
EDMUND J. BUZICKY, ROBERT E. JOHNSON
JAMES R. HILMANOWSKI & RUSSELL J. MLINAR
BY
Hofgren, Brady, Wegner, Allen & Stellman
ATT'YS June 29, 1965 E. J. BUZICKY ETAL Re. 25,814

APPARATUS FOR DISPENSING PARTICULAR MATERIAL

Original Filed Nov. 16, 1959

3 Sheets-Sheet 2

INVENTORS:
EDMUND J. BUZICKY, ROBERT E. JOHNSON
JAMES R. HILMANOWSKI & RUSSELL J. MLINAR
BY
Hofgren, Brady, Wegner, Allen & Stellman

ATT'YS

June 29, 1965 E. J. BUZICKY ETAL Re. 25,814

APPARATUS FOR DISPENSING PARTICULAR MATERIAL

Original Filed Nov. 16, 1959

3 Sheets-Sheet 3

INVENTORS:
EDMUND J. BUZICKY, ROBERT E. JOHNSON
JAMES R. HILMANOWSKI & RUSSELL J. MLINAR
BY
Hofgren, Brady, Wegner, Allen, Stellman
ATT'YS United States Patent Office Re. 25,814
Reissued June 29, 1965

25,814

APPARATUS FOR DISPENSING PARTICULATE MATERIAL

Edmund J. Buzicky, Robert E. Johnson, James R. Hilmanowski, and Russell J. Mlinar, St. Paul, Minn., assignors to Whirlpool Corporation, a corporation of Delaware Original No. 3,038,641, dated June 12, 1962, Ser. No. 853,368, Nov. 16, 1959. Application for reissue June 3, 1964, Ser. No. 382,981
16 Claims. (Cl. 222—129)

Matter enclosed in heavy brackets [ ] appears in the original patent but forms no part of this reissue specification; matter printed in italics indicates the additions made by reissue.

This invention relates to dispensing apparatus and in particular to apparatus for dispensing particulate material such as powdered detergent in appliances such as dishwashers.

In dishwashers it is desirable to provide a pre-rinse operation in which the dishes are rinsed with clear water prior to a first washing operation wherein detergent is added to the water. It is further desirable to provide a rinse operation subsequent to the washing operation, and then provide a second washing operation wherein detergent is provided in the washing water. The instant invention comprehends a dispenser for providing the detergent material in such a cycle of operation.

One feature of the invention is the provision of new and improved apparatus for dispensing particulate material, such as detergent, for use in a device such as a dishwasher appliance.

Another feature of the invention is the provision of such apparatus including a pair of receptacles each having an opening, a first closure pivotally mounted to swing from a first position closing one opening to a second position exposing that opening, a second closure pivotally mounted to swing from a first position closing the other opening to a second position exposing that opening, and means releasably holding each of the closures in the first position including a member movable between a first and second disposition operable upon movement thereof from the first to the second disposition to release the first closure to swing to its second position and operable upon movement thereof from the second to the first disposition to release the second closure to swing to its second position.

A further feature is the provision of such apparatus including a cam movable between a first and second disposition having a first portion engaging the first closure during movement of the cam from the first to the second disposition to release the first closure from the holding means to swing to its second position, and having a second portion engaging the second closure during movement of the cam from the second to the first disposition to release the second closure from the holding means to swing to its second position.

Still another feature of the invention is the provision of such apparatus wherein the receptacles are laterally spaced and the openings therein face horizontally, the cam being positioned between the receptacles and being rotatable to effect the indicated functioning.

A yet further feature is the provision of such apparatus wherein the cam is provided with a spring yieldably engaging the second closure during movement of the cam from the first to the second disposition to permit continued holding by the holding means of the second closure in the first position, and positively engaging the second closure during movement of the cam from the second to the first disposition to release the second closure from the holding means.

A still further feature of the invention is the provision of such apparatus including a support and means pivotally mounting the receptacles on the support for movement between a first arrangement wherein the opening faces upwardly to a second arrangement wherein the opening faces horizontally, and wherein the first position of the closures is obtained when the receptacles are in the second arrangement.

Still another feature is the provision of such apparatus wherein the holding means releasably holds one of the closures in the first position, the other closure having means thereon engaging the first closure when the first closure is held in the first position to hold the second closure in the first position, the holding means being operable upon movement thereof from a first disposition to a second disposition to release the first closure therefrom to swing to its second position but retain the second closure in the first position, and being operable upon subsequent movement thereof from the second to the first disposition to release the second closure therefrom to swing to its second position.

Still another feature of the invention is the provision of such apparatus wherein the holding means comprises a reciprocable member and the closures are provided with co-operating shoulders, the shoulder of the first closure resting on the reciprocable member and the shoulder of the second closure resting on the first closure when the reciprocable member is in the first disposition, the finger of the first closure being disengaged from the second member and the finger of the second closure resting on the reciprocable member when the reciprocable member is in the second disposition, and the finger of the second closure being disengaged from the reciprocable member when it is returned to its first disposition.

Other features and advantages of the invention will be apparent from the following description taken in connection with the accompanying drawings wherein.

Figure 1:
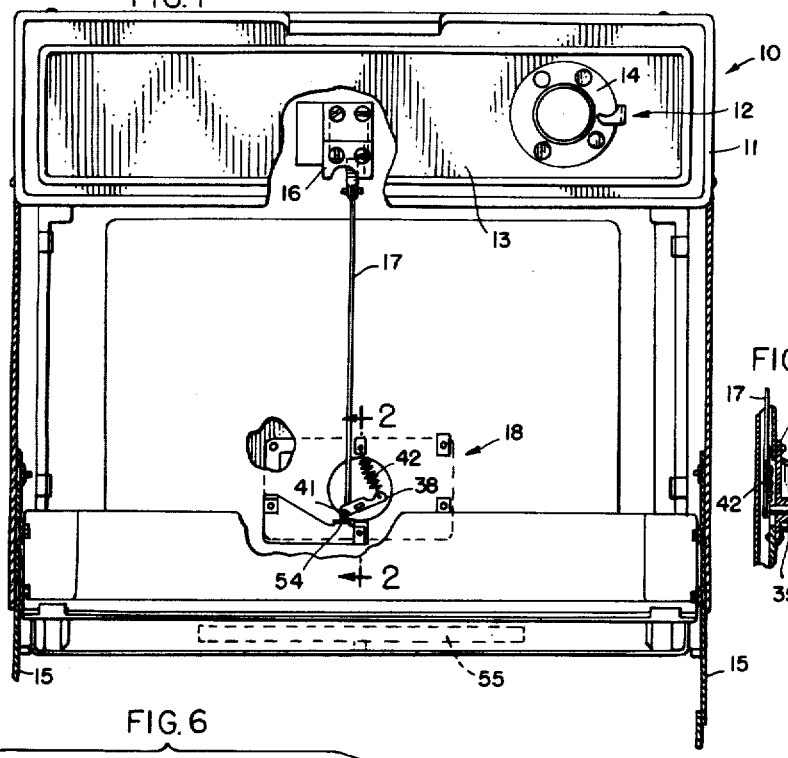
FIGURE 1 is a front elevation, partially in section and with parts thereof broken away, of a dishwasher provided with a dispensing apparatus embodying the invention.
Figure 2:
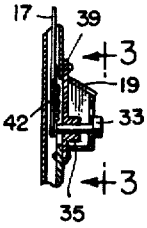
FIGURE 2 is a fragmentary vertical section taken substantially along the line 2—2 of FIGURE 1.

In the illustrative embodiment of the invention as shown in FIGURES 1 through 7 of the drawings a dishwasher generally designated 10 is provided with a door 11 having a sequential control mechanism 12 mounted in the upper portion 13 thereof and manually preset by a dial mechanism 14. The door is provided at its lower end with pivot supports 15 to permit the door to be swung forwardly and downwardly from the vertical position of FIGURE 1. The control mechanism 12 includes a solenoid 16 which, by means of a connecting rod 17, operates a detergent dispenser generally designated 18 carried in the door adjacent the lower end thereof.

The control mechanism 12, which may be of suitable conventional construction, functions to provide seriatim in dishwasher 10 a first, pre-rinse operation, a first wash operation, a rinse operation, a main wash operation, a second rinse operation, and a final drying operation. Solenoid 16 is energized by control mechanism 12 to move rod 17 suitably for operating dispenser 18 to dispense detergent into the wash water during the first wash and main wash operations.

More specifically, a dispenser 18 comprises a body member 19 defining a pair of receptacles 20 and 21 having horizontally facing openings 22 and 23 respectively and arcuate bottom walls 56. Receptacle 20 is provided with a lower left-hand corner boss 24.

Figure 3:
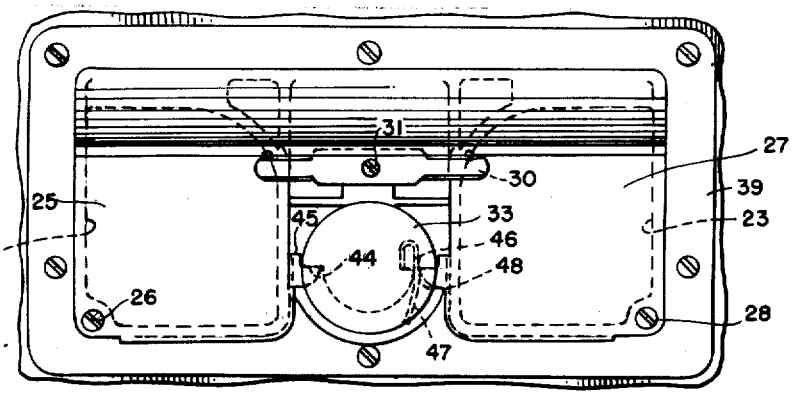
FIGURE 3 is an enlarged elevation of the dispensing means as taken in the direction of the arrows of FIGURE 2.
Figure 5:
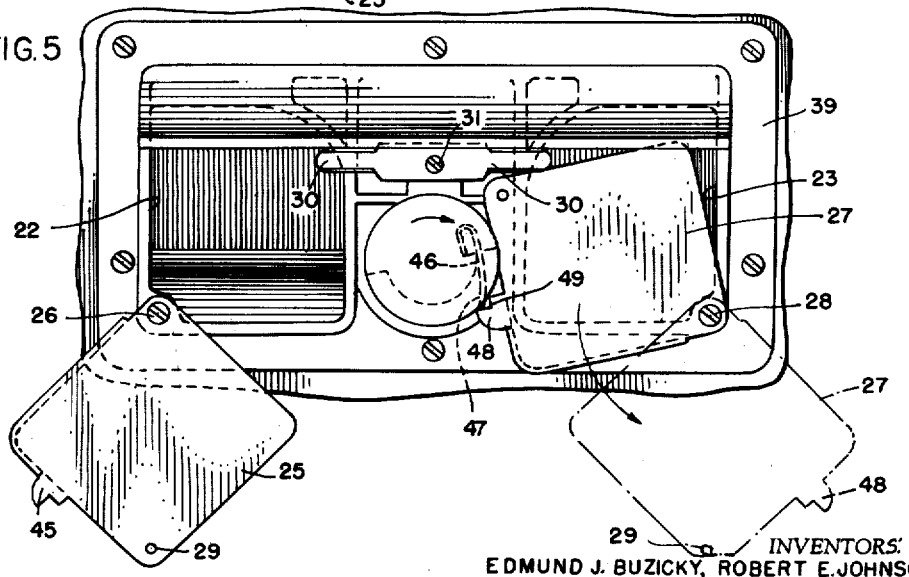
FIGURE 5 is an elevation generally similar to that of FIGURE 4, but with the cam means being rotated from the second to the first disposition subsequent to the rotation thereof to the second disposition.

A first closure plate 25 is pivotally secured to boss 24 by suitable means such as screw 26 for movement in the plane of opening 22 from a first position, as seen in FIGURE 3, closing opening 22 to a second position, as seen in FIGURE 5, exposing the opening. Receptacle 21 is provided with a complementary lower right-hand corner boss 25 and a second closure plate 27 is pivotally secured thereto by suitable means such as screw 28 to swing in the plane of opening 23 from a first position, as seen in FIGURE 3, closing opening 23 to a second position, as seen in FIGURE 5, exposing opening 23. Each of the closure plates is provided with a dimple 29 releasably engaging the opposite ends of a spring clip 30 secured by suitable means such as a screw 31 to a transverse portion 32 of body member 19 extending between receptacles 20 and 21, for releasably holding the closure plate in the first position of FIGURE 3. Thus, when door 11 is swung to the horizontal position, detergent may be placed in each of receptacles 20 and 21 and the closure plates 25 and 27 swung to the position of FIGURE 3 closing the openings 22 and 23 respectively of the receptacles to retain the detergent therein when the door is returned to its upright position, as seen in FIGURE 1.

Figure 6:
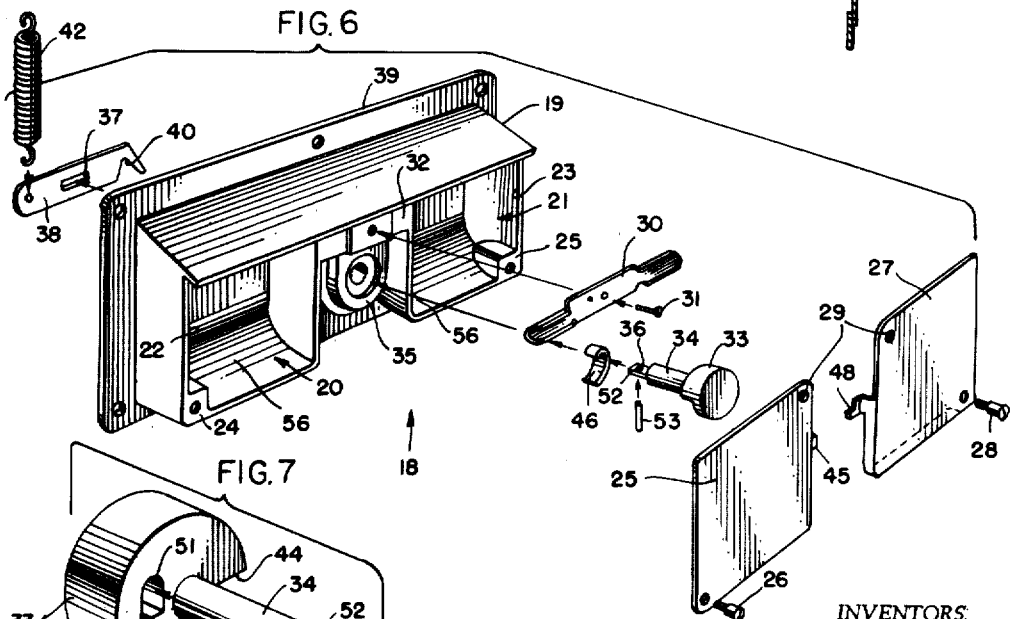
FIGURE 6 is an exploded perspective view of the dispensing means.
Figure 7:
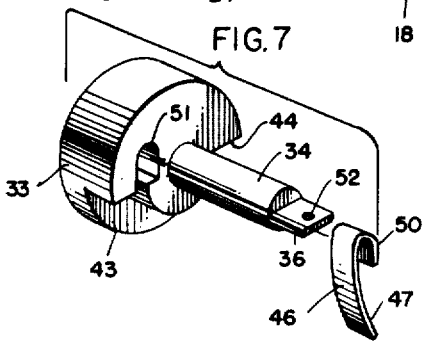
FIGURE 7 is an exploded perspective view of the cam and spring members thereof.
Figure 4:
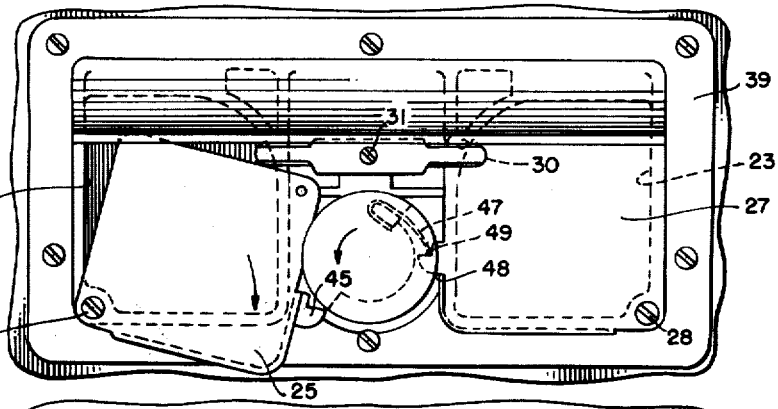
FIGURE 4 is an elevation generally similar to that of FIGURE 3, but with the cam means of the dispensing apparatus rotated from a first to a second disposition.

As indicated briefly above, it is desirable to provide a first, pre-rinse operation of the dishwater wherein no detergent is added to the water therein. Thus, during the initial cycle of operation, each of closure plates 25 and 27 is maintained in the position of FIGURE 3 Upon completion of the pre-rinse operation, closure plate 25 is swung downwardly on screw 26 to expose opening 22 and permit the detergent in receptacle 20 to be dispensed into the wash water. The swinging of closure plate 25 is effected by a cam 33 having a shank 34 rotatable in a bearing 35 provided in body member 19. Shank 34 extends fully through bearing 35 and is provided at its outer end with a flattened portion 36 received in a complementary slot 37 of a lever 38 facially juxtaposed to the rear wall 39 of the body member 19. At one end, the lever 38 is provided with a downwardly opening groove 40 in which is received a lower turned end 41 of rod 17. The other end of the rod is connected to a coil spring 42 secured at its outer end to door 11, which spring biases the lever 38 to urge the cam 33 in a clockwise direction as seen in FIGURES 3 through 5. Cam 33 is provided with a peripheral arcuate recess 43 defined at one end by a radial shoulder 44 disposed to engage a finger 45 on closure plate 25 and swing the closure plate downwardly, in a clockwise direction as seen in FIGURES 3 through 5, upon counterclockwise rotation of cam 33. A curved leaf spring 46 is secured to cam 33 to have its free end 47 biased radially outwardly into engagement with a finger 48 on closure plate 27. In moving from the first position of FIGURE 3, to the second position of FIGURE 4, the spring merely acts radially against finger 48 and effects no movement of closure plate 27. However, when the spring reaches the second position of FIGURE 4, the free end 47 thereof moves outwardly over a radially extending shoulder 49 of finger 48. Thus, upon subsequent clockwise rotation of cam 33, end 47 of the spring positively engages the finger shoulder 49 and effects a counterclockwise swinging of closure plate 27, as seen in FIG. 5. As best seen in FIGURE 7, the spring 46 is provided with a turned end 50 which is received in a suitable recess 51 in cam 33 to secure the spring to the cam. As seen in FIGURE 6, flat end 36 of the cam shank is provided with a hole 52 through which a suitable pin 53 is passed to secure the cam 33 and lever 38 in operative association on body member 19.

The operation of dispenser 18 is as follows. A suitable charge of detergent is placed in each of receptacles 20 and 21 by first pivoting door 11 to a horizontal position. The detergent is then placed in the receptacles and closure plates 25 and 27 are swung to the closed position wherein they extend across openings 22 and 23 respectively. The door 11 may now be swung to its vertical position. The closure plates are retained in this position by the spring clip 30. Solenoid 16 is deenergized at this time and, thus spring 42 urges lever 38 to the arrangement shown in FIGURE 1 wherein its counterclockwise movement is limited by engagement with a stop 54 carried on door 11. Thus, as seen in FIGURE 3, cam 33 is arranged to have radial shoulder 44 thereof disposed adjacent finger 45 of closure plate 25 and to have spring end 47 bear radially outwardly against finger 48 of closure plate 27. Actuation of control mechanism 12 may now be effected by operation of dial mechanism 14 to initiate the dishwashing cycle. As the detergent in each of receptacles 20 and 21 is completely enclosed, the first step of operation of the dishwater 10 may be a pre-rinse operation wherein only clear water is circulated therein.

At the completion of such as pre-rinse operation, a first washing operation may be effected. Thus, control mechanism 12 acts to energize solenoid 16 and thereby move rod 17 longitudinally upwardly to pivot lever 38 against the action of spring 42 and rotate cam 33 from the position of FIGURE 3 to the position of FIGURE 4. During such rotation, shoulder 44 of cam 33 moves finger 45 of closure plate 25 downwardly to swing forcibly the closure plate 25 from engagement with spring clip 30 and permit the closure plate to fall by the action of gravity from its position across opening 22 to expose opening 22 and permit the detergent in receptacle 20 to be dispensed into the water in the dishwasher. As shown in FIGURE 1, dispenser 18 is carried on door 11 adjacent the lower end thereof whereby the water thrown by the spray arm 55 in the bottom of the dishwasher forcibly flushes the exposed receptacle, running freely outwardly therefrom over the curved bottom wall portion 56 thereof to assure a complete dispensing of the detergent. During this operation, closure plate 27 remains in its closed position across opening 23 as spring 46 merely acts radially against finger 48 of closure plate 27.

Upon completion of the first washing operation, the wash water is drained and a subsequent rinse operation caused by control mechanism 12. Upon completion of the rinse operation, and a subsequent refilling of the dishwater with fresh water, control mechanism 12 deenergizes solenoid 16 to dispense the detergent from receptacle 21 to cause a second washing operation in the dishwasher 10. More specifically, when solenoid 16 is de-energized, spring 42 pulls lever 38 to rotate cam 33 back to the position of FIGURE 3. Thus, as seen in FIGURE 5, free end 47 of spring 46 acts positively against shoulder 49 of finger 48 on closure plate 27 to swing that closure plate forcibly downwardly away from spring clip 30, and cause the closure plate to swing away from its closed position across opening 23, dispensing the detergent from receptacle 21 into the water in the dishwater. Thus, cam 33 is automatically returned to the first position of FIGURE 3, permitting the user to recharge the receptacles with detergent and close the receptacles by swinging the closure plates to the position of FIGURE 3, as discussed above.

Another form of detergent dispenser, generally designated 118, is illustrated in FIGURES 8 through 15. Dispenser 118 is generally similar to dispenser 18 and corresponding elements thereof are identified by reference numerals 100 higher. Dispenser 118 functions generally similar to dispenser 18 in that controlled closure of receptacles 120 and 121 of dispenser 118 is effected by a pair of closure plates 125 and 127, respectively. However, dispenser 118 is provided with another form of means for controlling the release of closure plates 125 and 127.

More specifically, the closure plate control means of dispenser 118 comprises an elongated cam, or block, 154 having a square transverse cross section and longitudinally slidable through a corresponding squared bearing 135 in the body member 119 of the dispenser. Longitudinal reciprocation of the block 154 is effected by a cable 155 having a first looped end 156 received in a slot 157 in block 154 and secured to the block by suitable means such as pin 158. The opposite looped end 159 of the cable is adapted to be secured to end 41 of the rod 17 connected to solenoid 16. Block 154 is biased outwardly through bearing 135 by a coil spring 160 having one end seated on a retainer 161 secured to the mounting plate 162 of the dispenser and the other end seated on a retainer 163 bearing on a pin 164 extending through the block 154.

The operation of dispenser 118 is generally similar to the operation of dispenser 18 in that successive releases of closure plates 125 and 127 provide pre-rinse, first wash, rinse, and main wash operations of the dishwasher. More specifically, in dispenser 118, block 154 controls the swinging movement of the closure plates 125 and 127. To retain the closure plates in the closed position across receptacles 120 and 121, closure plate 127 is provided with a finger 148 which rests on the upper surface of block 154. Closure plate 125 is provided with a finger 145 having an outer end 165 which is cut away to rest on a corresponding cut-away outer end 166 of finger 148. Outer end 165 of finger 145 is provided with an L-shaped extension 167 having an end portion 168 extending transversely to the block 154 and movable through a vertical groove 169 in one side face of the block. When block 154 is urged to its outermost position by spring 160, extension portion 168 overlies slot 169 but is prevented from downward movement therethrough by the engagement of end 166 of finger 148 with end 165 of finger 145. Thus, the closure plates are retained in the closed position across the receptacles.

Figure 10:
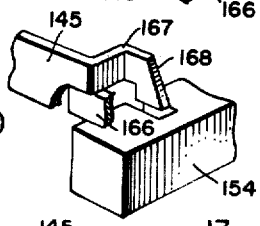
FIGURE 10 is a perspective view thereof looking from the opposite side thereof.
Figure 11:
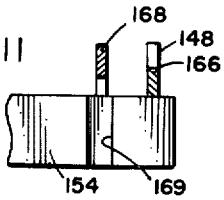
FIGURE 11 is a vertical section taken substantially along the line 11—11 of FIGURE 9.
Figure 12:
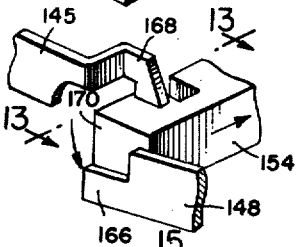
FIGURE 12 is a perspective view generally similar to that of FIGURE 10 but with the block repositioned to release one of the fingers.
Figure 13:
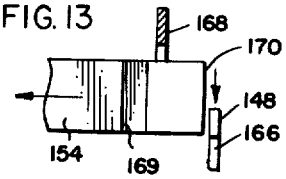
FIGURE 13 is a vertical section taken substantially along the line 13—13 of FIGURE 12.
Figure 14:
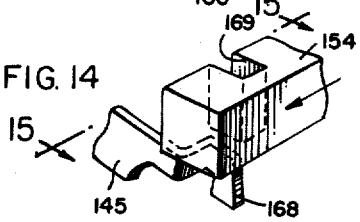
FIGURE 14 is a perspective view generally similar to that of FIGURE 12 but with the block repositioned to release the other of the fingers.
Figure 15:
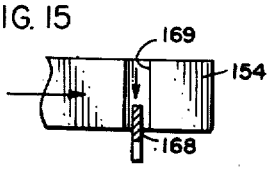
FIGURE 15 is a vertical section taken substantially along the line 15—15 of FIGURE 14.

When end 159 of cable 155 is pulled upwardly, as by energization of solenoid 16, block 154 is pulled inwardly through bearing 135 from the position of FIGURE 10 to the position of FIGURE 12. This permits finger 148 of closure plate 127 to fall past the outer end 170 of the block 154 thereby opening receptacle 121. Finger 145 moves downwardly at the same time but transverse portion 168 thereof strikes the upper surface of block 154 and prevents swinging of the closure plate 125 away from the closed position across receptacle 120.

When, at the initiation of a subsequent wash cycle, solenoid 16 is de-energized spring 160 restores block 154 to its outer position wherein slot 169 becomes disposed below transverse portion 168 of finger outer end extension 167. As finger 148 is no longer disposed to prevent the falling of finger 145, portion 168 falls through slot 169 and closure plate 125 swings away from receptacle 120 to dispense detergent therefrom.

Figure 8:
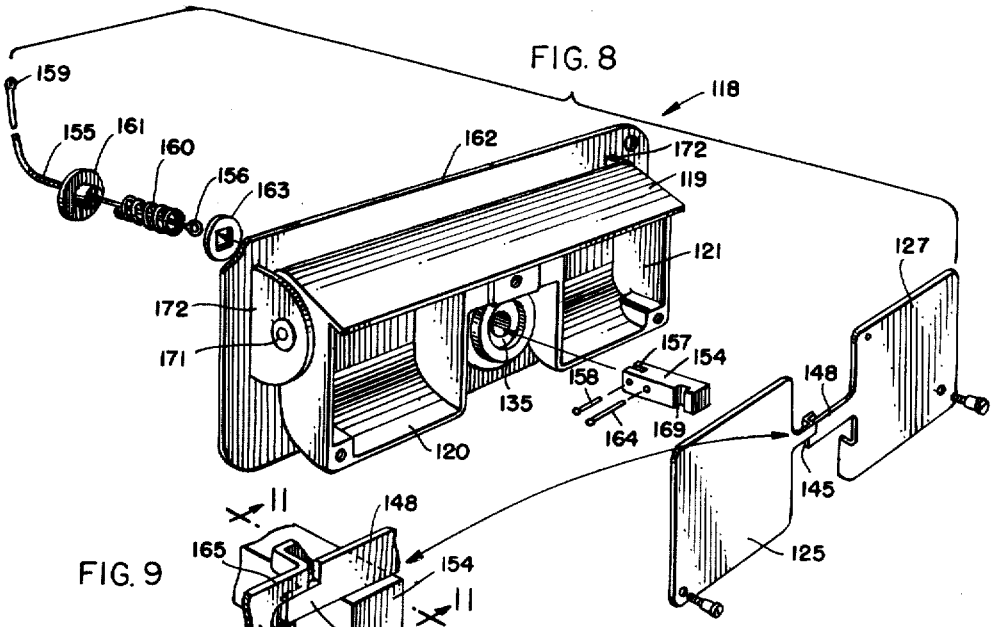
FIGURE 8 is an exploded perspective view of another form of dispenser embodying the invention.
Figure 9:
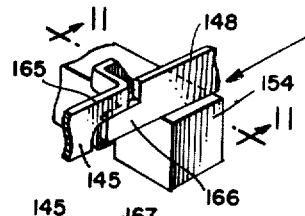
FIGURE 9 is a fragmentary enlarged perspective view of the closure plate fingers and block end in association for retaining the closure plates in a receptacle closing position.

To permit the mounting of the detergent dispenser on a fixed vertical wall of the dishwasher, such as a side wall or rear wall thereof (which is desirable where the dishwasher is of the top loading type) the body member defining the detergent holding receptacles may be pivotally mounted on the supporting plate of the dispenser. Thus, the dispensers may be pivoted to an upwardly opening disposition when being filled with detergent. The closure plates are then swung to the closed position permitting the receptacles to be re-pivoted to the position wherein they open horizontally, as the closure plates now serve to prevent dispensing of the detergent from the receptacles until they are swung to the open position by the above described control means. Such a pivotal mounting of the receptacles is illustrated in FIGURE 8 wherein the body member 119 is pivotally mounted by suitable means such as rivets 171 on a pair of supports 172 extending forwardly from the mounting plate 162 of the dispenser. As shown in FIGURE 8, the body member is mounted so that its center of gravity is below the rivets 171, whereby the receptacles automatically pivot to the horizontally opening position when released by the operator.

While we have shown and described certain embodiments of our invention, it is to be understood that it is capable of many modifications. Changes, therefore, in the construction and arrangement may be made without departing from the spirit and scope of the invention as defined in the appended claims.

The embodiments of the invention in which an exclusive property or privilege is claimed are defined as follows:

1. Apparatus for dispensing particulate material, comprising: a pair of receptacles each having an opening; a first closure pivotally mounted to swing from a first position closing one opening to a second position exposing said one opening; a second closure pivotally mounted to swing from a first position closing the other opening to a second position exposing said other opening; means releasably holding each of said closures in said first position; and means including a member movable between a first and second disposition operable upon movement thereof from said first to said second disposition to release said first closure and cause it to swing to its second position, and operable upon subsequent movement thereof from said second to said first disposition to release said second closure and cause it to swing to its second position.

2. Apparatus for dispensing particulate material, comprising: a pair of receptacles each having an opening; a first closure pivotally mounted to swing from a first position closing one opening to a second position exposing said one opening; a second closure pivotally mounted to swing from a first position closing the other opening to a second position exposing said other opening; means releasably holding each of said closures in said first position; and a cam movable between a first and second disposition having a first portion engaging said first closure during movement of said cam from said first to said second disposition to release said first closure from said holding means and cause it to swing to its second position, and having a second portion engaging said second closure during subsequent movement of said cam from said second to said first disposition to release said second closure from said holding means and cause it to swing to its second position.

3. Apparatus for dispensing particulate material, comprising: a pair of laterally spaced receptacles each having a horizontally facing opening; a first closure pivotally mounted to swing from a first position closing one opening to a second position exposing said one opening; a second closure pivotally mounted to swing from a first position closing the other opening to a second position exposing said other opening; means releasably holding each of said closures in said first position; and a cam between said receptacles rotatable between a first and second disposition, said cam having a first portion engaging said first closure during rotation of the cam from said first to said second disposition to release said first closure from said holding means and cause said first closure to swing to its second position, and having a second portion engaging said second closure during subsequent rotation of said cam from said second to said first disposition to release said second closure from said holding means and cause said second closure to swing to its second position.

4. Apparatus for dispensing particulate material, comprising: a pair of receptacles each having an opening; a first closure pivotally mounted to swing from a first position closing one opening to a second position exposing said one opening; a second closure pivotally mounted to swing from a first position closing the other opening to a second position exposing said other opening; means releasably holding each of said closures in said first position; and a cam movable between a first and second disposition having a first portion engaging said first closure during movement of said cam from said first to said second disposition to release said first closure from said holding means and cause said first closure to swing to its second position, and having a spring yieldably engaging said second closure during movement of the cam from said first to said second disposition to permit continued holding by said holding means of said second closure in said first position, and positively engaging said second closure during subsequent movement of said cam from said second to said first disposition to release said second closure from said holding means and cause said second closure to swing to its second position.

5. Apparatus for dispensing particulate material, comprising: a support; a pair of receptacles each having an opening; means pivotally mounting the receptacles on the support for movement between a first arrangement wherein the opening faces upwardly to a second arrangement wherein the opening faces horizontally, a first closure pivotally mounted to swing from a first position closing the opening of one receptacle when the receptacle is in the second arrangement to a second position exposing said one opening; a second closure pivotally mounted to swing from a first position closing the opening of the other receptacle when said other receptacle is in the second arrangement to a second position exposing said other opening; means releasably holding each of said closures in said first position including a member movable between a first and second disposition operable upon movement thereof from said first to said second disposition to release said first closure and cause it to swing to its second position, and operable upon subsequent movement thereof from said second to said first disposition to release said second closure from said holding means and cause it to swing to its second position.

6. Apparatus for dispensing particulate material, comprising: a pair of receptacles each having an opening; a first closure pivotally mounted to swing from a first position closing one opening to a second position exposing said one opening; a second closure pivotally mounted to swing from a first position closing the other opening to a second position exposing said other opening; and holding means releasably holding one of said closures in said first position, the other closure having means thereon engaging said first closure when said first closure is held in said first position to hold said second closure in said first position, said holding means being operable upon movement thereof from a first disposition to a second disposition to release said first closure therefrom and cause it to swing to its second position but retain said second closure in said first position, and being operable upon subsequent movement thereof from said second to said first disposition to release said second closure therefrom and cause it to swing to its second position.

7. The dispensing apparatus of claim 6 wherein said holding means comprises a reciprocable member and said closures are provided with co-operating shoulders, the shoulder of said first closure resting on said member and the shoulder of said second closure resting on said first closure when said member is in said first disposition, said shoulder of said first closure being disengaged from said member and said shoulder of said second closure resting on said member when said member is in said second disposition, and said shoulder of said second closure being disengaged from said member when said member is returned to said first disposition.

8. Apparatus for dispensing particulate material, comprising: a support; a cup having an open end; means mounting said cup on said support for movement between an upwardly opening, filling position and a horizontally opening, dispensing position; a closure; means for releasably holding said closure across said open end with the cup in the dispensing position to retain particulate material in said cup despite the cup being in said dispensing position; and means operable to overcome said holding means with said cup still in the dispensing position whereby said closure is removed from across said open end to dispense said particulate material.

9. Apparatus for dispensing particulate material, comprising: a pair of receptacles each having an opening; a first closure plate pivotally mounted on one receptacle to swing from a first position closing the opening thereof to a second position exposing said opening thereof; a second closure plate pivotally mounted on the second receptacle to swing from a first position closing the opening thereof to a second position exposing said opening thereof; a yieldable clip holding each of said closure plates in said first position; and a disc cam rotatable selectively to first and second dispositions and having a spring arm engaging said second closure plate during rotation of said cam from said first to said second position to release said first closure plate from said clip and cause said first closure plate to swing to its second position, said spring arm yieldably engaging said second closure during rotation of said cam from said first to said second position permitting continued holding by said clip of said second closure plate in said first position and positively engaging said second closure plate during rotation of said cam from said second to said first position to release said second closure plate from said clip and cause said second closure plate to swing to its second position.

10. Apparatus for dispensing particulate material, comprising: a pair of receptacles each having an opening; a first closure plate pivotally mounted on one receptacle to swing from a first position closing the opening thereof to a second position exposing said opening thereof, and having a projecting finger; a second closure plate pivotally mounted on the second receptacle to swing from a first position closing the opening thereof to a second position exposing said opening thereof, and having a projecting finger engaging said first closure plate finger when said closure plates are in said first position, said second closure plate finger having an offset portion; and an elongated member reciprocable longitudinally to first and second dispositions and having an end portion engaging said first closure plate finger when said member is in its first disposition and thereby holding both closure plates in said first position thereof, said first closure plate finger being disengaged from said end portion of the elongated member and said offset portion of said second closure plate finger engaging said end portion of said elongated member upon movement of said elongated member to its second disposition whereby said first closure plate may move to its second position while said second closure plate is retained in its first position, said end portion of said elongated member having clearance with said offset portion of said second closure plate upon movement of said elongated member back to its first disposition whereby said second closure plate finger is disengaged from said end portion and said second closure plate may move to its second position.

*11. Apparatus for dispensing particulate material, comprising: a support; a cup having an open end; means mounting said cup on said support for movement between an upwardly opening, filling position and a horizontally opening, dispensing position; a closure; means for releasably holding said closure across said open end with the cup in the dispensing position to retain particulate material in said cup despite the cup being in said dispensing position; and means for operation solely mechanically, independently of liquid presence conditions adjacent the cup, to overcome said holding means with said cup still in the dispensing position whereby said closure is removed from across said open end to dispense said particulate material.*

*12. Apparatus for dispensing particulate material, comprising: a support; a cup having an open end; means mounting said cup on said support for movement between an upwardly opening, filling position and a horizontally opening, dispensing position; a closure; means for releasably holding said closure across said open end with the cup in the dispensing position to retain particulate material in said cup despite the cup being in said dispensing position; a member engaging said closure; and means for operation solely mechanically, independently of liquid presence conditions adjacent the cup, to cause said member to overcome said holding means with said cup still in the dispensing position whereby said closure is removed from across said open end to dispense said particulate material.*

*13. Apparatus for dispensing particulate material, comprising: a support; a pair of cups each having an open end; means mounting said cups on said support for movement between an upwardly opening, filling position and a horizontally opening dispensing position; closure means for selectively closing said cups; means for releasably holding said closure means across said open end of each cup, with said cups in the dispensing position to retain particulate material in said cups despite the cups being in said dispensing position; and means selectively operable to overcome said holding means with said cups still in the dispensing position whereby firstly said closure means is removed from across said open end of said one cup to dispense said particulate material therefrom and said closure means is subsequently removed from across said open end of said other cup to dispense said particulate material therefrom.*

*14. The apparatus of claim 13 wherein said last named means comprises a member.*

*15. Apparatus for dispensing particulate material, comprising: a support; a pair of cups each having an open end; means mounting said cups on said support for movement between an upwardly opening, filling position and a horizontally opening, dispensing position; a first closure; a second closure; means for releasably holding said first closure across said open end of one cup, and releasably holding said second closure across said open end of the other cup, said cups in the dispensing position to retain particulate material in said cups despite the cups being in said dispensing position; and means selectively operable to overcome said holding means with said cups still in the dispensing position whereby firstly said first closure is removed from across said open end of said one cup to dispense said particulate material therefrom and said second closure is subsequently removed from across said open end of said other cup to dispense said particulate material therefrom.*

*16. The apparatus of claim 15 wherein said last named means comprises a member.*

References Cited by the Examiner

The following references cited by the Examiner, are of record in the patented file of this patent or the original patent.

UNITED STATES PATENTS

| | | | |
|---|---|---|---|
| 651,990 | 6/00 | Forest | 222—166 X |
| 2,790,493 | 4/57 | Wenzelberger | 222—504 X |
| 2,812,881 | 11/57 | Karig | 222—166 X |
| 2,816,427 | 12/57 | Vela. | |
| 2,875,927 | 3/59 | Tufford et al. | |
| 2,969,072 | 1/61 | Barritt. | |
| 3,038,640 | 6/62 | Braga et al. | 222—166 X |
| 3,102,032 | 8/63 | Lippert | 222—504 X |

FOREIGN PATENTS

| | | |
|---|---|---|
| 1,002,198 | 10/51 | France. |
| 776,138 | 6/57 | Great Britain. |

RAPHAEL M. LUPO, *Primary Examiner.*